(12) United States Patent
Harumoto et al.

(10) Patent No.: US 8,073,618 B2
(45) Date of Patent: Dec. 6, 2011

(54) DRIVING SUPPORT APPARATUS AND METHOD

(75) Inventors: Satoshi Harumoto, Hyogo (JP);
Yuusaku Matsuda, Hyogo (JP);
Kazuyuki Matsumura, Hyogo (JP);
Teruomi Kuwano, Hyogo (JP); Shuuji Yamada, Hyogo (JP); Taiichiro Sakoda, Hyogo (JP); Ryouhei Kanemaru, Hyogo (JP); Hidenobu Suzuki, Ann Arbor, MI (US); Motohiro Nakamura, Okazaki (JP); Masato Kobayashi, Aichi (JP)

(73) Assignees: Fujitsu Ten Limited, Kobe (JP); Toyota Jidosha Kabushiki Kaisha, Toyota (JP); Aisin Aw Co., Ltd., Anjo (JP)

( * ) Notice: Subject to any disclaimer, the term of this patent is extended or adjusted under 35 U.S.C. 154(b) by 1141 days.

(21) Appl. No.: 11/793,772

(22) PCT Filed: Dec. 26, 2005

(86) PCT No.: PCT/JP2005/023737
§ 371 (c)(1),
(2), (4) Date: Aug. 21, 2007

(87) PCT Pub. No.: WO2006/068268
PCT Pub. Date: Jun. 29, 2006

(65) Prior Publication Data
US 2009/0326814 A1    Dec. 31, 2009

(30) Foreign Application Priority Data

Dec. 24, 2004    (JP) ................................. 2004-374454

(51) Int. Cl.
*G01C 21/36* (2006.01)

(52) U.S. Cl. ......... 701/210; 701/201; 701/209; 701/207

(58) Field of Classification Search .................. 701/201, 701/207, 209, 210
See application file for complete search history.

(56) References Cited

U.S. PATENT DOCUMENTS

| | | | |
|---|---|---|---|
| 5,410,486 A | 4/1995 | Kishi et al. | |
| 6,061,628 A * | 5/2000 | Hayashi et al. | 701/208 |
| 6,249,214 B1 * | 6/2001 | Kashiwazaki | 340/425.5 |
| 6,269,304 B1 * | 7/2001 | Kaji et al. | 701/209 |
| 6,388,565 B1 * | 5/2002 | Bernhard et al. | 340/435 |
| 6,388,582 B2 * | 5/2002 | Yamashita et al. | 340/988 |
| 6,700,505 B2 * | 3/2004 | Yamashita et al. | 340/988 |
| 6,728,634 B2 * | 4/2004 | Monde et al. | 701/209 |
| 7,089,111 B2 * | 8/2006 | Irie | 701/211 |
| 7,103,475 B2 * | 9/2006 | Irie | 701/211 |
| 7,970,529 B2 * | 6/2011 | Mori et al. | 701/117 |
| 2009/0326814 A1 * | 12/2009 | Harumoto et al. | 701/210 |

FOREIGN PATENT DOCUMENTS

JP        A 06-052493        2/1994

(Continued)

OTHER PUBLICATIONS

Korean Office Action issued in corresponding Korean Patent Application No. 10-2007-7014197, issued Feb. 2, 2010.

*Primary Examiner* — Thomas Black
*Assistant Examiner* — Wae Louie
(74) *Attorney, Agent, or Firm* — Oliff & Berridge, PLC

(57) ABSTRACT

A driving support apparatus supports a driver in driving a vehicle on a road by giving instructions. The driving support apparatus includes a recognizing unit that recognizes a current driving lane that is a lane on the road in which the vehicle is currently running; a lane setting unit that sets a driving schedule lane that is a lane in which the vehicle is to be driven; and a guiding unit that determines content of lane guidance based on the driving schedule lane and the current driving lane, and guides the driver to a lane based on the lane guidance when the road is substantially straight.

13 Claims, 11 Drawing Sheets

FOREIGN PATENT DOCUMENTS

| | | |
|---|---|---|
| JP | A 08-313291 | 11/1996 |
| JP | A 10-089997 | 4/1998 |
| JP | A 10-104009 | 4/1998 |
| JP | A 2000-018956 | 1/2000 |
| JP | A 2001-034769 | 2/2001 |
| JP | A 2001-227970 | 8/2001 |
| JP | A 2002-078009 | 3/2002 |
| JP | B2 3301386 | 4/2002 |
| JP | A 2002-188933 | 7/2002 |
| JP | A 2002-318130 | 10/2002 |
| JP | A 2004-171060 | 6/2004 |
| JP | A 2004-185504 | 7/2004 |

* cited by examiner

DRIVING SUPPORT APPARATUS AND METHOD

TECHNICAL FIELD

The present invention relates to a driving support apparatus that supports a driver in driving a vehicle, and more particularly, to a driving support apparatus that supports a driver in driving a vehicle by giving notifications to perform course guidance.

BACKGROUND ART

Recently, driving support apparatuses, namely, navigation apparatuses have been widely used, that support a driving operation by notifying a direction to drive before an intersection, so that the driver can drive in accordance with a driving scheduled course set in advance.

Conventional navigation apparatuses indicate the direction to drive at a divergence point. However, sometimes the roads have a plurality of lanes and the driver has to change to a lane corresponding to the direction to drive. In order to support such a lane change, Patent Document 1, for example, discloses a technology for supporting smooth driving through more than two closely spaced intersections by guiding the driver to drive in a specific lane when exiting a first intersection, which is suitable for driving through a second intersection.

Also, in order to prevent guiding to an erroneous lane by giving an instruction at an inappropriate timing, Patent Document 2 discloses a technology for setting, on the basis of a mergence or a divergence of lanes on a course between a current position of its own vehicle and a guidance diverging point, a recommended driving lane in which driving is appropriately possible from the current position of the vehicle to a course beyond the guidance diverging point, and for performing predetermined lane guidance at each approach of a point to be notified before a diverging point to be notified.

Patent Document 1: Japanese Patent Application-Laid-Open No. 2001-227970
Patent Document 2: Japanese Patent No. 3301386

DISCLOSURE OF INVENTION

Problem to be Solved by the Invention

In the conventional technologies, however, guidance is performed with uniform contents and at predetermined timing with regardless of a current driving lane of its own vehicle and shapes of the road. Accordingly, there can be a case where guidance for an appropriate lane is given to the driver even when the driver is driving in the appropriate lane, or a case where guidance is performed while the driver is concentrating on driving because the vehicle is running on a curved road.

Moreover, when higher driving skills are required, for example, when there are many lanes to be changed, it can be advantageous to notify the driver in advance that the driving is going to be difficult. Moreover, it can be advantageous, depending on the skill of the driver, to avoid a driving operation requiring a higher skill and to take an easier driving route even if the easier driving route is a detour. However, the conventional technologies do not consider the level of difficulty in driving or the skill of driver.

The driver requires a detailed guidance on a rout where the driver have never drive. However, such a problem occurs that a detailed guidance can be annoying on a route where the driver drives frequently because the driver is well known the road, the role of each lane, and the level of difficulty in driving.

In other words, the conventional navigation has a problem that contents of notification to be given to the driver can be too much or too little, and another problem that efficiency of notification can be reduced depending on timing of the notification and shapes of the road. Thus, realizing of a navigation apparatus which performs guidance with suitable contents at suitable timing depending on a situation has become a significant issue.

The present invention has been achieved to solve the above problems in the conventional technology and it is an object of the present invention to provide a navigation apparatus that performs guidance with suitable contents at suitable timing based on a situation.

Means for Solving Problem

To solve the above problems and achieve the object, according to an aspect of the invention, a driving support apparatus that supports a driver in driving a vehicle on a road by giving instructions, includes a recognizing unit configured to recognize a current driving lane of the vehicle that is a lane on the road in which the vehicle is currently running; a lane setting unit configured to set a driving schedule lane that is a lane in which the vehicle is to be driven; and a guiding unit configured to determines content of lane guidance based on the driving schedule lane and the current driving lane, and guides the driver to a lane based on the lane guidance when the road is substantially straight.

According to the above aspect, the driving support apparatus recognizes the current driving lane of the vehicle that is the lane on the road in which the vehicle is currently running, sets a course of the lane in which the vehicle is to be driven, and performs the lane guidance based on the driving schedule lane and the current driving lane when the vehicle is driven in a straight portion of the road.

Moreover, according to another aspect of the invention, the driving support apparatus further comprises a course setting unit configured to set a driving schedule course that is a course in which the vehicle is to be driven, wherein the guiding unit guides the driver to a driving course based on the driving schedule course.

According to the above aspect of the invention, the driving support apparatus sets the driving schedule course of the vehicle, recognizes the current driving lane of the vehicle that is the lane on the road in which the vehicle is currently running, sets the course of a lane in which the vehicle is to be driven, and performs guidance of the driving schedule lane and the driving schedule course.

Furthermore, according to still another aspect of the invention, the driving support apparatus further includes a map-data storing unit configured to store therein map data indicative of shapes of the road and number of lanes on the road.

According to the above aspect of the invention, the driving support apparatus includes the map-data storing unit that stores therein map data indicative of shapes of the road and number of lanes on the road. The driving support apparatus recognizes the current driving lane of the vehicle that is the lane on the road in which the vehicle is currently running, sets the course of a lane in which the vehicle is to be driven, and performs the lane guidance based on the driving schedule lane and the driving schedule course.

Moreover, according to still another aspect of the invention, the driving support apparatus further includes a driver-information obtaining unit configured to obtain driver information indicative of driving skills of the driver.

According to the above aspect of the invention, the driving support apparatus obtains the driver information, recognizes the current driving lane of the vehicle that is the lane on the road in which the vehicle is currently running, sets the course of a lane in which the vehicle is to be driven, and performs the lane guidance based on the driving schedule lane and the driving schedule course.

Furthermore, according to still another aspect of the invention, the driving support apparatus further includes a traffic-information obtaining unit configured to obtain traffic information indicative of traffic conditions on the road.

According to the above aspect of the invention, the driving support apparatus obtains the traffic information, recognizes the current driving lane of the vehicle that is the lane on the road in which the vehicle is currently running, sets the course of a lane in which the vehicle is to be driven, and performs the lane guidance based on the driving schedule lane and the driving schedule course.

According to another aspect of the invention of claim 6, the driving support apparatus recognizes the current driving lane of the vehicle that is the lane on the road in which the vehicle is currently running, sets the course of a lane in which the vehicle is to be driven, and changes, when the guidance is performed based on the driving schedule lane and the driving schedule course, the timing of guidance.

Furthermore, according to an aspect of the invention of claim 7, in the driving support apparatus according to claim 6 the timing changing unit obtains the shapes of the road from the map data, and performs the guidance when the road is straight.

According to another aspect of the invention of claim 7, the driving support apparatus performs the guidance to the driver when the road is straight.

Moreover, according to an aspect of the invention of claim 8, in the driving support apparatus according to claim 6 or 7, the timing changing unit changes the timing of performing the guidance based on the driver information and/or the traffic information.

Furthermore, according to still another aspect of the invention, in the driving support apparatus, the guiding unit includes a driver adapting unit configured to change contents of guidance to the driver based on driver information indicative of driving skills of the driver.

According to the above aspect of the invention, the driving support apparatus recognizes the current driving lane of the vehicle that is the lane on the road in which the vehicle is currently running, sets the course of a lane in which the vehicle is to be driven, and changes the contents of guidance based on the driver information when the lane guidance is performed based on the driving schedule lane and the current driving lane.

Moreover, according to still another aspect of the invention, in the driving support apparatus the guiding unit includes a difficulty-level judging unit configured to judge at least one of a level of difficulty in driving in accordance with the driving schedule lane and a level of difficulty in driving in accordance with the driving schedule course and notifies the driver of factors that have caused a rise in the level of difficulty.

According to the above aspect of the invention, the driving support apparatus determines the level of difficulty in driving in accordance with the driving schedule lane or the driving schedule course, and notifies a factor that has caused a rise in the level of difficulty.

Furthermore, according to still another aspect of the invention, in the driving support apparatus the difficulty-level judging unit judges the level of difficulty using the current driving lane and map data indicative of shapes of the road and number of lanes on the road.

According to the above aspect of the invention, the driving support apparatus determines the level of difficulty in driving based on the current driving lane and the map data.

Moreover, according to still another aspect of the invention, in the driving support apparatus the guiding unit includes a course-resetting judging unit configured to judge whether resetting of the driving schedule course is necessary based on difficultness in driving in the driving schedule lane.

According to the above aspect of the invention, when it is difficult or impossible to drive in accordance with the driving schedule lane, the driving support apparatus resets the driving schedule course.

Furthermore, according to still another aspect of the invention, in the driving support apparatus the lane setting unit sets the driving schedule lane based on the driving schedule course and map data indicative of shapes of the road and number of lanes on the road.

According to the above aspect of the invention, the driving support apparatus sets the driving schedule lane based on the driving schedule course and the map data, and performs lane guidance based on the driving schedule lane.

Moreover, according to still another aspect of the invention, in the driving support apparatus the lane setting unit sets the driving schedule lane based on at least any one of the level of difficulty in driving in accordance with the driving schedule lane, driver information indicative of driving skills of the driver, and traffic information indicative of traffic conditions on the road.

According to the above aspect of the invention, the driving support apparatus sets the driving schedule lane based on the level of difficulty in driving, the traffic information, and the driver information in addition to the driving schedule course and the map data, and performs lane guidance based on the driving schedule lane.

Effect of the Invention

According to an aspect of the invention, the driving support apparatus recognizes the current driving lane of the vehicle that is the lane on the road in which the vehicle is currently running, sets a course of the lane in which the vehicle is to be driven, and performs the lane guidance based on the driving schedule lane and the current driving lane when the vehicle is driven in a straight portion of the road. Thus, it is possible to obtain an effect of providing the driving support apparatus that can perform the lane guidance suitable for the current driving lane at the timing such that the driver can safely recognize contents of the guidance without fail.

Moreover, according to another aspect of the invention, the driving support apparatus sets the driving schedule course of the vehicle, recognizes the current driving lane of the vehicle that is the lane on the road in which the vehicle is currently running, sets the course of a lane in which the vehicle is to be driven, and performs guidance of the driving schedule lane and the driving schedule course. Thus, it is possible to obtain an effect of providing the driving support apparatus that can perform the lane guidance and the course guidance suitable for the current driving lane.

Furthermore, according to still another aspect of the invention, the driving support apparatus includes the map-data storing unit that stores therein map data indicative of shapes of the road and number of lanes on the road. The driving support apparatus recognizes the current driving lane of the vehicle that is the lane on the road in which the vehicle is currently running, sets the course of a lane in which the vehicle is to be driven, and performs the lane guidance based on the driving schedule lane and the driving schedule course. Thus, it is possible to obtain an effect of providing the driving support apparatus that can perform the guidance suitable for the current driving lane, the shapes of the road, and the roles of the lanes.

Moreover, according to still another aspect of the invention, the driving support apparatus obtains the driver information, recognizes the current driving lane of the vehicle that is the lane on the road in which the vehicle is currently running, sets the course of a lane in which the vehicle is to be driven, and performs the lane guidance based on the driving schedule lane and the driving schedule course. Thus, it is possible to obtain an effect of providing the driving support apparatus that can perform the guidance suitable for the current driving lane and the driver.

Furthermore, according to still another aspect of the invention, the driving support apparatus obtains the traffic information, recognizes the current driving lane of the vehicle that is the lane on the road in which the vehicle is currently running, sets the course of a lane in which the vehicle is to be driven, and performs the lane guidance based on the driving schedule lane and the driving schedule course. Thus, it is possible to obtain an effect of providing the driving support apparatus that can performs the guidance suitable for the current driving lane and the traffic condition.

Moreover, according to still another aspect of the invention, the driving support apparatus recognizes the current driving lane of the vehicle that is the lane on the road in which the vehicle is currently running, sets the course of a lane in which the vehicle is to be driven, and changes the contents of guidance based on the driver information when the lane guidance is performed based on the driving schedule lane and the current driving lane. Thus, it is possible to obtain an effect of providing the driving support apparatus that can perform the guidance with contents suitable for the driver.

Furthermore, according to an aspect of the invention of claim 7, the driving support apparatus performs the guidance to the driver when the road is straight. Thus, it is possible to obtain an effect of providing the driving support apparatus that can perform the guidance at timing the driver can safely recognize contents of the guidance without fails.

Moreover, according to still another aspect of the invention, the driving support apparatus recognizes the current driving lane of the vehicle that is the lane on the road in which the vehicle is currently running, sets the course of a lane in which the vehicle is to be driven, and changes the contents of guidance based on the driver information when the lane guidance is performed based on the driving schedule lane and the current driving lane. Thus, it is possible to obtain an effect of providing the driving support apparatus that can perform the guidance with contents suitable for the driver.

Furthermore, according to still another aspect of the invention, the driving support apparatus determines the level of difficulty in driving in accordance with the driving schedule lane or the driving schedule course, and notifies a factor that has caused a rise in the level of difficulty. Thus, it is possible to obtain an effect of providing the driving support apparatus that can notify the driver that a higher driving skill is going to be required.

Moreover, according to still another aspect of the invention, the driving support apparatus determines the level of difficulty in driving based on the current driving lane and the map data. Thus, it is possible to obtain an effect of providing the driving support apparatus that can correctly determine the level of difficulty in driving, and notify the driver that a higher driving skill is going to be required.

Furthermore, according to still another aspect of the invention, when it is difficult or impossible to drive in accordance with the driving schedule lane, the driving support apparatus resets the driving schedule course. Thus, it is possible to obtain an effect of providing the driving support apparatus that can set an optimal course in response to condition changes.

Moreover, according to still another aspect of the invention, the driving support apparatus sets the driving schedule lane based on the driving schedule course and the map data, and performs lane guidance based on the driving schedule lane. Thus, it is possible to obtain an effect of providing the driving support apparatus that can set the driving schedule lane based on the shapes of the road, and perform the proper lane guidance.

Furthermore, according to still another aspect of the invention, the driving support apparatus sets the driving schedule lane based on the level of difficulty in driving, the traffic information, and the driver information in addition to the driving schedule course and the map data, and performs lane guidance based on the driving schedule lane. Thus, it is possible to obtain an effect of providing the driving support apparatus that can perform the lane guidance suitable for the level of difficulty in driving, the traffic information, and the driver information.

EXPLANATIONS OF LETTERS OR NUMERALS

Figure 1:
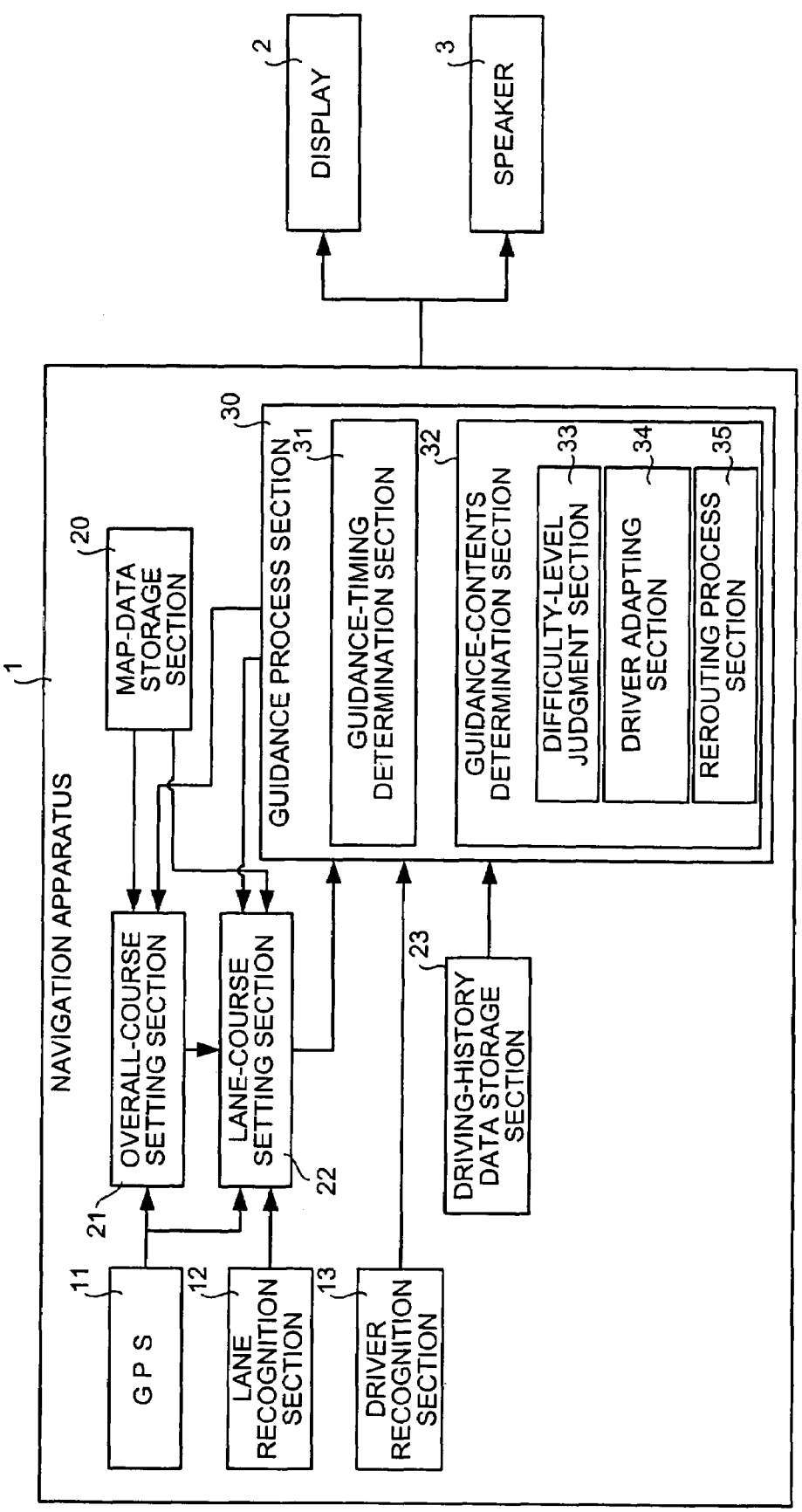
FIG. 1 is a diagram for depicting general constituents of a navigation apparatus according to an embodiment of the present invention.

1 Navigation apparatus
2 Display
3 Speaker
11 GPS
12 Lane recognition section
13 Driver recognition section
20 Map data storage section
21 Overall-course setting section
22 Lane course setting section
23 Driving-history data storage section 30 Guidance process section
31 Guidance-timing determination section
32 Guidance-contents determination section
33 Difficulty-level judgment section
34 Driver adapting section
35 Rerouting process section

BEST MODE(S) FOR CARRYING OUT THE INVENTION

Exemplary embodiments of a navigation apparatus, or a driving support apparatus, according to the present invention will be explained below with reference to the accompanying drawings.

Embodiment

FIG. 1 is a diagram for depicting general constituents of a navigation apparatus 1 according to an embodiment of the present invention. As shown in the figure, the navigation apparatus 1 is connected to a display 2 and a speaker 3. The navigation apparatus 1 includes a Global Positioning System (GPS) 11, a lane recognition section 12, a driver recognition section 13, a map-data storage section 20, an overall-course setting section 21, a lane-course setting section 22, a driving-history data storage section 23, and a guidance process section 30.

The display 2 is a display output device that is used for display or output of the navigation apparatus 1 or other in-vehicle apparatus such as an in-vehicle audio apparatus. Similarly, the speaker 3 is a voice output device that is used for outputting a voice from the navigation apparatus 1 or other in-vehicle apparatus.

The GPS 11 is a means for identifying the position of its own vehicle by performing communications with an artificial satellite, and outputs the identified position information to both the overall-course setting section 21 and the lane-course setting section 22. The lane recognition section 12 recognizes a current driving lane of the vehicle, and outputs the current driving lane information to the lane-course setting section 22.

The driver recognition section 13 recognizes the driver of the vehicle, and outputs driver information indicative of the driver to the guidance process section 30. The recognition of the driver can be performed, for example, by using a recording medium in a form of a card, or by using a key assigned to each of drivers. Another approach is to perform image recognition. It is preferable that the driver information includes information indicative of driving skills of the recognized driver.

The map-data storage section 20 stores therein map data that includes data indicative of shapes of roads, number of lanes on each road etc, and supplies the map data to both the overall-course setting section 21 and the lane-course setting section 22.

The overall-course setting section 21 sets a driving schedule course of the vehicle using the position information received from the GPS 11 and the map data received from the map-data storage section 20. The lane-course setting section 22 uses the position information received from the GPS 11, the map data received from the map-data storage section 20, and the current driving lane received from the lane recognition section 12 to set a driving schedule lane as an optimum lane course for driving in accordance with the driving schedule course set by the overall-course setting section 21.

The driving-history data storage section 23 stores therein data indicative of course history of the vehicle. It is preferable that the driving history data includes courses driven in the past and a driver in a correspondence manner. It is not necessary to store the driving-history data in the navigation apparatus 1. The driving-history data can be stored in a detachable recording medium such as a card.

The guidance process section 30 is a process section that performs course guidance to the driver, and includes a guidance-timing determination section 31 and a guidance-contents determination section 32. The guidance-timing determination section 31 is a process section that determines timing for performing the course guidance to the driver.

Assuming a case that the road is curved in a portion immediately before a point requiring guidance (guidance point) such as an intersection at which the vehicle is to be turned right or left, and if the course guidance is provided at a normal timing, the course guidance is provided to the driver who is in the curve. In this case, because the driver is carefully driving the vehicle on the curved road, it is difficult for the driver to pay sufficient attention to contents displayed on the display 2.

In this case, by changing the timing for performing guidance such that the guidance is performed while the vehicle is driven on the straight road before the guidance point, the driver can safely recognize the contents of the output guidance without fails.

The timing of both of the display output and the voice output can be changed. It is also allowable to change the timing of the display output only, and perform the voice output at normal timing. This is because the voice output is more easily recognizable than the display output even during the driving operation.

The guidance-contents determination section 32 is a process section that determines contents of the guidance to be output, and includes a difficulty-level judgment section 33, a driver adapting section 34, and a rerouting process section 35. The difficulty-level judgment section 33 judges a level of difficulty in driving in accordance with the driving schedule lane set by the lane-course setting section 22. The factors that cause the level of difficulty to rise (such as necessity of lane change across a plurality of lanes) can be informed to the driver so that the driver can recognize the difficulty in driving in advance.

The driver adapting section 34 performs a process for changing the guidance contents depending on the driver information and the driving history data. For example, if the identified driver is a beginner, the guidance contents are changed to more detailed one. If the driver is an expert, only highly-selected essential guidance contents are provided.

Similarly, if the vehicle is driving on a road that the driver uses frequently, because it is assumed that the driver well knows about shapes of the road and roles of the lanes (for example, which line is a right turn lane, or a straight through line, and an appropriate timing for changing lines), the guidance contents are simplified. On the other hand, when the driver is driving on a road that the driver has never driven, detailed guidance contents are provided.

When it is difficult or impossible to drive in accordance with the driving schedule lane, the rerouting process section 35 judges that it is necessary to reset the driving schedule course or the driving schedule lane, and performs a process for causing the overall-course setting section 21 or the lane-course setting section 22 to reset the driving schedule course or the driving schedule lane.

For example, if the level of difficulty is high and the driver is less skilled as indicated by the driver information, the rerouting process section 35 judges that it is necessary to reset the driving schedule course or the driving schedule lane. Similarly, if it is impossible to take the driving schedule lane due to traffic conditions (traffic congestions, accidents, or road constructions, etc.), the rerouting process section 35 judges that it is necessary to reset the driving schedule course or the driving schedule lane. The traffic information can be obtained using any known technology, such as VICS (vehicle information and communication system).

If the vehicle swerves from the driving schedule course or the driving schedule lane, the overall-course setting section 21 and the lane-course setting section 22 automatically perform resetting of the driving schedule course or the driving schedule lane. However, another configuration is allowable in which the resetting is performed by the rerouting process section 35.

Thus, the navigation apparatus 1 recognizes the current driving lane of its own vehicle in addition to position information obtained by the GPS 11, sets an optimum driving schedule lane, and controls timing and contents of guidance based on the shapes of the road, the level of difficulty in driving, the skills and driving history of the driver, and the traffic information.

Figure 2:
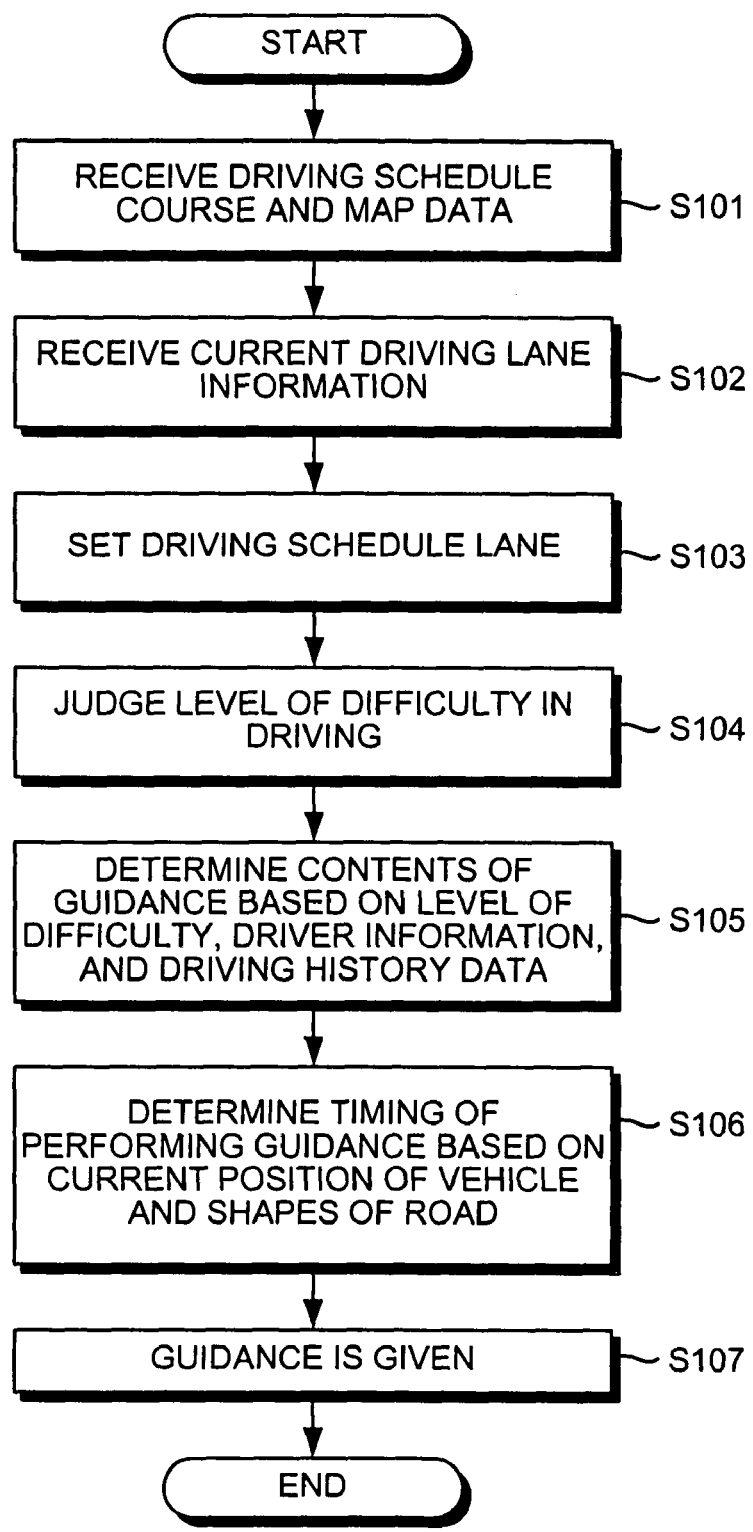
FIG. 2 is a flow chart for explaining processing operations performed by the navigation apparatus shown in FIG. 1.

Next, a process procedure performed by the navigation apparatus 1 is described with reference to the flow chart shown in FIG. 2. The process procedure shown in the figure is repeatedly performed while a driving schedule course set by the overall-course setting section 21 is in set.

As shown in the figure, the lane-course setting section 22 firstly receives a driving schedule course from the overall-course setting section 21 and shapes of the road and roles of the lanes from the map-data storage section 20 (step S101), and receives the current driving lane from the lane recognition section 12 (step S102).

Then, the lane-course setting section 22 sets a driving schedule lane based on the received driving schedule course, the shapes of the road, the roles of the lanes, and the current driving lane (step S103). Then, the difficulty-level judgment section 33 judges the level of difficulty in driving in the driving schedule lane (step S104). The guidance-contents determination section 32 determines contents of the guidance based on the level of difficulty, the driver information, and the driving history data (step S105).

After the guidance-timing determination section 31 determines the timing of performing the guidance based on the current position and the shapes of the road (step S106), guidance process is performed by using the display 2 and the speaker 3 (step S107), and the process control ends.

A case has been described above where the driving schedule course is set beforehand. However, when a driving schedule course is not set but a course to drive can be estimated, it is possible to perform guidance similar to the case the driving schedule course is in set.

Subsequently, a specific example of the guidance provided by the navigation apparatus 1 to the driver is given below. In this specific example shown in FIG. 3, the vehicle is to be driven from a position A1 on a road R10 to a road R16.

The road R10 has four lanes near a position A1 and an exit to a road R11 is in the leftmost lane of the road R10. Thereafter, two leftmost lanes of the road R10 diverge into a road R12 at a divergence point. After the divergence point, the road R12 adds one lane to have three lanes in total.

After the road R10 having two lanes at a divergence point loses one lane on the right before a merger point (position A4), the road R10 merges with a road R13. The road R13 has three lanes before merging with the road R10. A road R14 enters the road R13 through a leftmost lane of the three lanes.

The road R13 has four lanes after merging with the road R10. After a road R15 diverts from the road R13 at a position A5, one lane on the left diverges into a road R16 at the position A6. After the diversions, the road R16 adds one lane to have two lanes in total. The other three lanes on the right of the road R13 stretch beyond.

Thus, when driving from the position A1 to go to the road R16, it is necessary to use either of the two lanes on the right before the divergence point where the road R10 diverges from the road R12. Furthermore, after the road R10 merges into the road R13, it is necessary to change lines across at least three lanes before entering the road R16.

Figure 3:
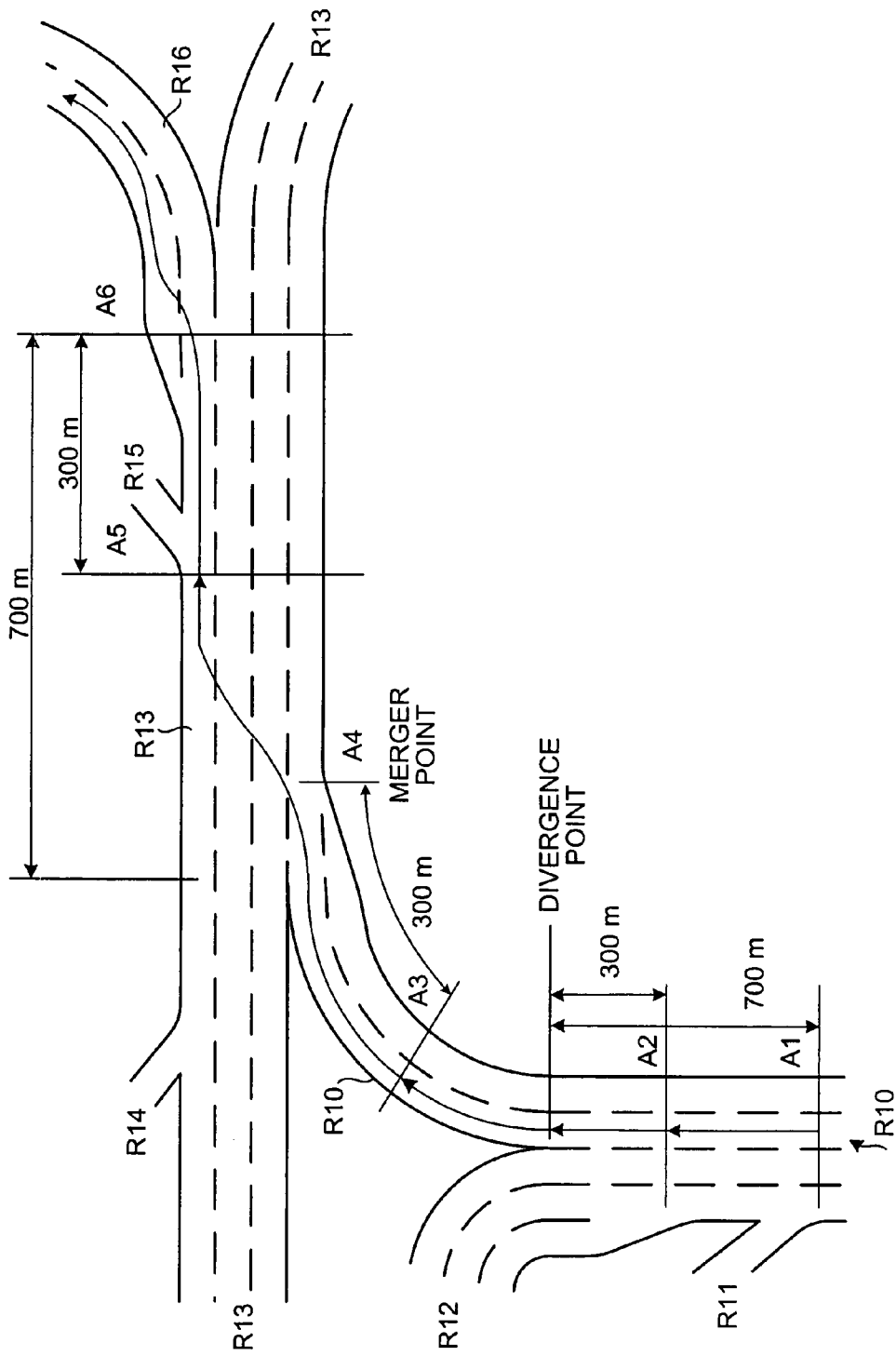
FIG. 3 is a schematic to explain a first specific example of the guidance according to the present invention.
Figure 4:
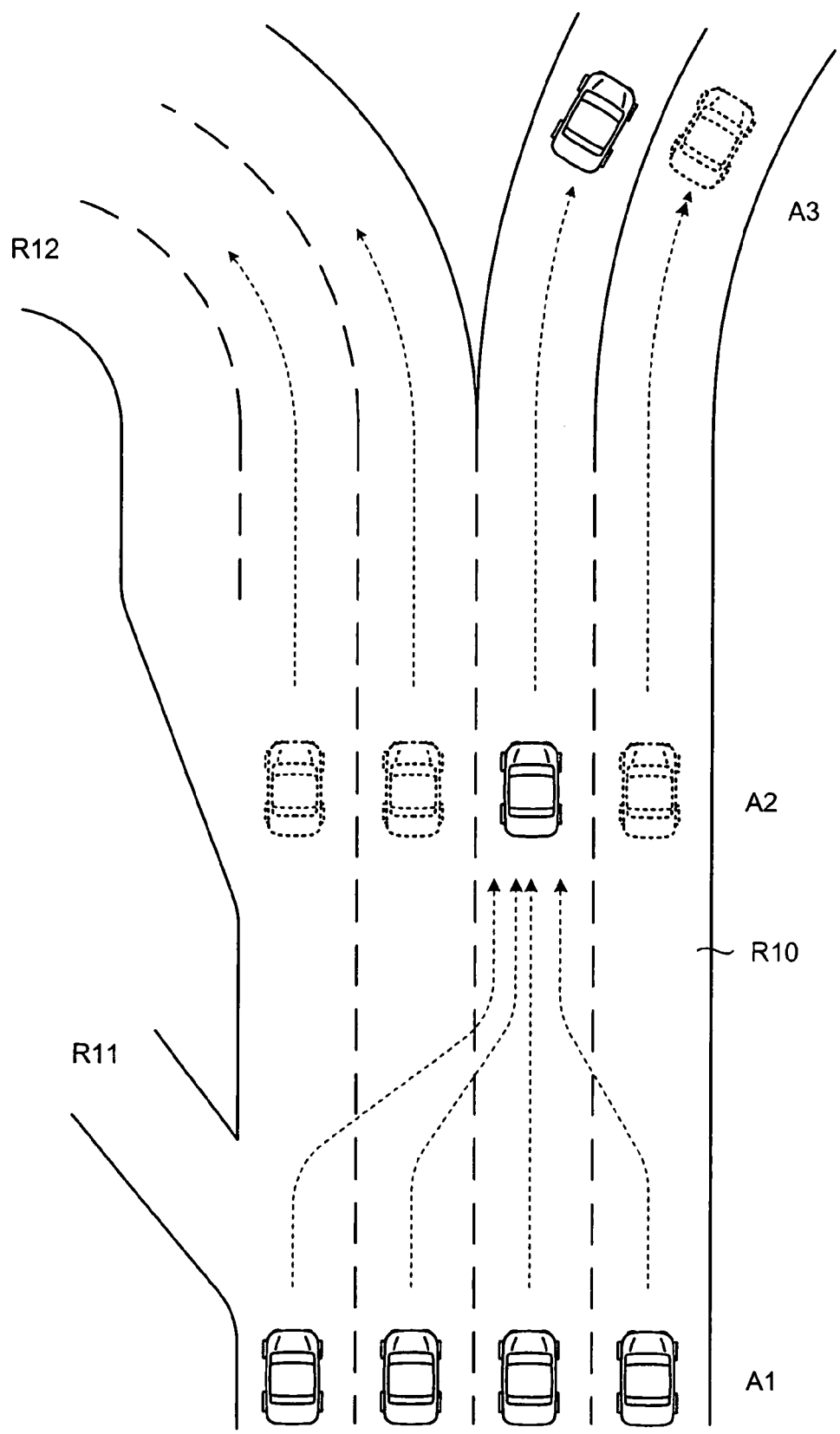
FIG. 4 is a schematic for further describing the specific example shown in FIG. 3 (part 1).
Figure 6:
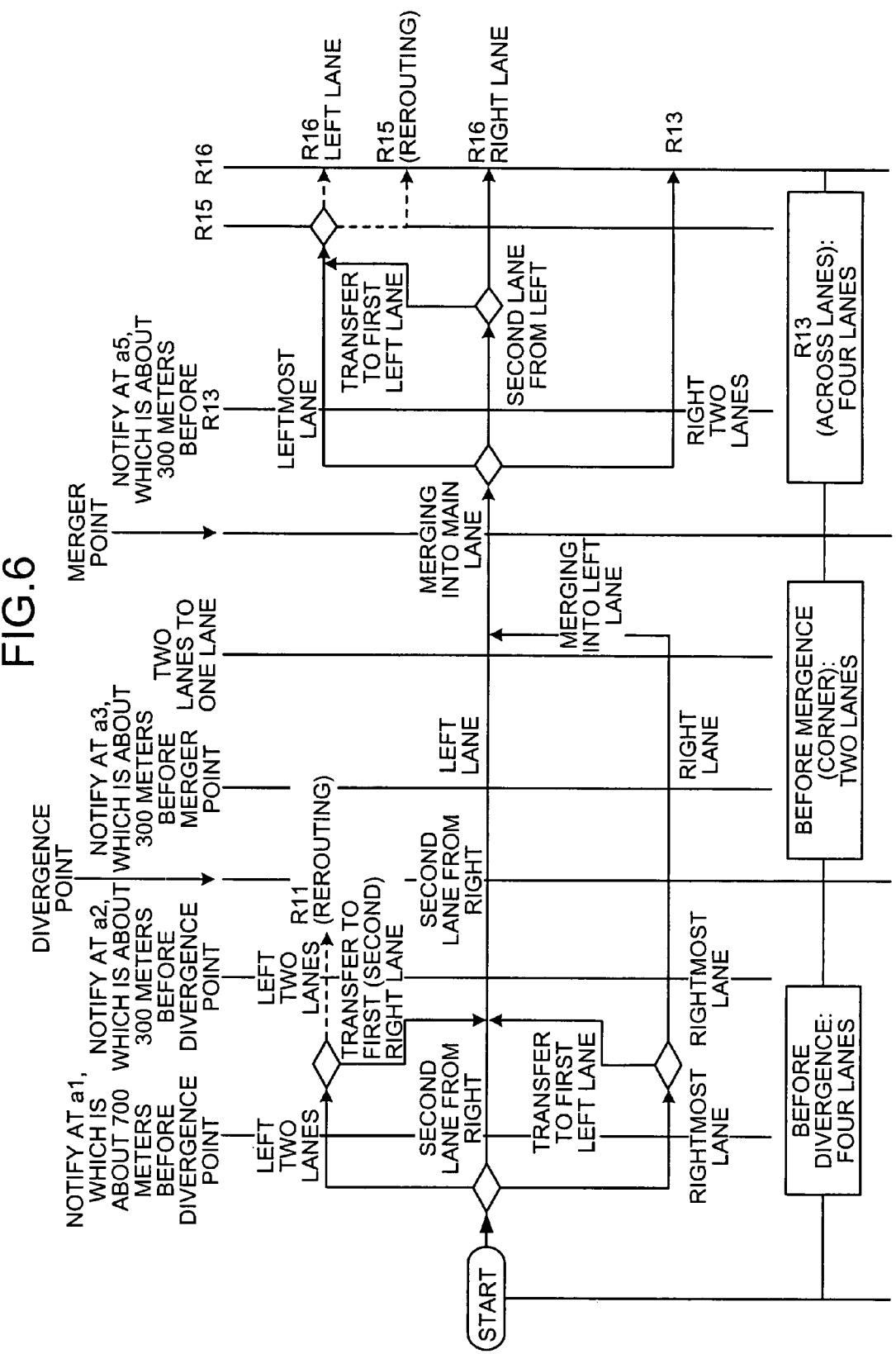
FIG. 6 is a schematic for further describing the specific example shown in FIG. 3 (part 3).

In the situation as shown in FIG. 3, the operation for giving guidance until the road R10 merges into the road R13 is described with reference to FIGS. 4 and 6. When the vehicle arrives at the position A1, which is about 700 meters before the divergence point of the road R10 and the road R12, the navigation apparatus 1 guides the driver to change to a lane on the right, if the vehicle is driving in the leftmost lane or the second lane from the left.

In this case, after the road R10 has two lanes due to the divergence from the road R12, the left lane of the road R10 merges into the road R13. Thus, it is necessary to drive in the left lane before the road R10 merges into the road R13 and therefore it is preferable to drive in the second lane from the right of the road R10 in advance.

If the vehicle is driving in the leftmost lane at the position A1, voice guidance instructs the driver to change to the second right lane therefrom. If the vehicle is driving in the second lane from the leftmost lane, voice guidance instructs the driver to the first right lane therefrom. Moreover, the reason for changing the lane, namely, the facts that the current driving lane is going to be off the driving schedule course and that the second lane from the right is suitable when entering the road R13 is also notified via voice guidance. Moreover, a map of an area near the divergence point of the road R10 and the road R12 is displayed on the display 2 as display guidance.

Similarly, if the vehicle is driving in the second lane from the right at the position A1, voice guidance instructs the driver to maintain the current driving lane and the reason thereof (the fact that the second lane from the right is suitable for the mergence into the road R13) is also notified. Moreover, the map of the area near the divergence point of the road R10 and the road R12 is displayed as display guidance.

If the vehicle is driving in the rightmost lane at the position A1, voice guidance instructs the driver to transfer to the first left lane therefrom and the reason thereof (the fact that the second lane from the right is suitable for the mergence into the road R13) is also notified. Moreover, a map of an area near the divergence point is displayed as display guidance.

Thereafter, when the vehicle arrives at the position A2, which is about 300 meters before the divergence point, if the vehicle is driving in the leftmost lane or the second lane from the left, (because the lane was not changed after the position A1), voice guidance instructs the driver to drive on the road R12, since it is dangerous to change to the right lane at this time. By going off the road R12, the vehicle swerves from the driving schedule course; however, a new driving schedule course for driving from the road R12 to the road R16 can be set (rerouted) and the new route can be displayed on the display 2.

On the other hand, if the vehicle is driving in the second lane from the right at the position A2, to notify the driver in advance that a high driving skill is required for entering the road R16 after merging into the road R13, information on the road R13 is given by using voice at this point of time.

Specifically, information to be notified includes the facts that "a distance between the merger point into the road R13 to the enter point to the road R16 is short (about 700 meters)", "the driver must transfer across three lanes in about 700 meter", and "it is necessary to change to the left lane after merging into the road R13". Moreover, display guidance is performed on the display 2 to indicate that the high driving skill is required to enter the road R16 after merging into the road R13.

If the vehicle is driving in the rightmost lane at the position A2, (the lane was not changed after the position A1), voice guidance instructs the driver to merge into the road R13 from the current driving lane, since it is dangerous to change to the left lane at this time. Then, a map of an area around the merger point (position A4) is displayed on the display 2 notifying that it is necessary to merge into the left lane before merging into the road R13 after the divergence from the road R12.

Furthermore, to notify the driver in advance that a high driving skill is required to enter the road R16, information about the road R13 is given at this time of point by using voice. The notified information about the road R13 and the guidance displayed on the display 2 are the same as in the case where the vehicle drives in the second lane from the right.

Thereafter, when the vehicle arrives at a position A3, which is about 300 meters before the merger point of the road R10 and the road R13, if the vehicle is driving in the left lane, voice guidance notifies the driver that the right lane is going to merge with the current driving lane before the road R10 merges with the road R13. In this case, display guidance is not performed since the vehicle is driving on the curve.

On the other hand, if the vehicle is driving in the right lane when the vehicle arrives at the position A3, voice guidance notifies the driver that the current driving lane is going to merge into the left lane before the road R10 merges into the road R13. In this case, display guidance is not performed since the vehicle is driving on the curve.

Figure 5:
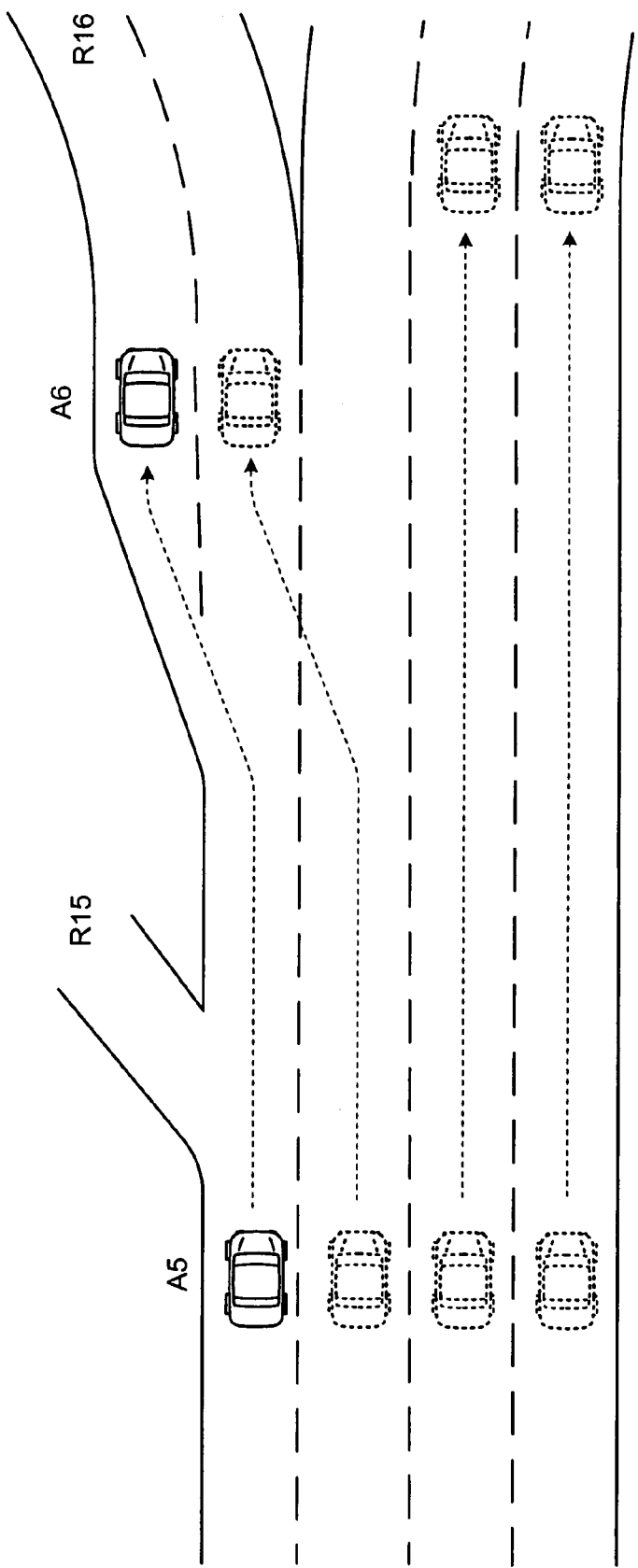
FIG. 5 is a schematic for further describing the specific example shown in FIG. 3 (part 2).

In the following, guidance after the road R10 merges into the road R13 is described with reference to FIGS. 5 and 6. When the vehicle arrives at the position A5, which is about 300 meters before the divergence point of the road R13 and the road R16, if the vehicle is driving in the leftmost lane, voice guidance instructs the driver to enter the road R16 after passing the entrance to the road R15 without erroneously entering the road R15. Also, the guidance instructs the driver to drive in the left lane of the road R16. This is because another vehicle can cut in from the right lane due to the increase of the number of lanes of the road R16 from one lane to two lanes. If it is possible to recognize another vehicle in the right lane, the recognition result thereof is desirably notified as "the reason to drive in the left lane". Moreover, a map of an area around the divergence point of the road R13 and the road R16 is displayed on the display 2.

If the vehicle is driving in the second lane from the left at the position A5, voice guidance instructs the driver to change lanes to the first left lane therefrom and enter the road R16 after passing the road R15, since it is possible to drive safely by entering the road R16 from the leftmost lane without the necessity of cutting in. Or, voice guidance instructs the driver to keep driving in the second lane from the left and drive in the right lane of the road R16. The adoption of either of the driving schedule lanes can be determined on the basis of the skills of the driver, traffic conditions, and the like. A map of the vicinity of the divergence point of the road R13 and the road R16 is displayed on the display 2.

On the other hand, if the vehicle is driving in the rightmost lane or the second lane from the right at the position A5, voice guidance instructs the driver to keep driving on the road R13 since it is dangerous to change lanes to the left at this time. By keeping driving on the road R13, the vehicle swerves from the driving schedule course. Therefore, a new driving schedule course for driving from the road R13 to the road R16 is set (rerouted) and the new route is displayed on the display 2.

Another specific example of the guidance provided by the navigation apparatus 1 to the driver is given below. In this specific example shown in FIG. 7, the vehicle is to be driven from a position B1 of a road R20 to a road R22.

The road R20 has two lanes. The road R20 curves at the position B1 and has a long straight portion (straight portion that starts at a start position R20a and ends to an end position R20b). Thereafter, the road has a repetition of curves and short straight portions. An exit to the road R22 is in the right lane at a position B5 and an exit to the road R21 is also in the right lane before the road R22.

Thus, upon driving from the position B1 to the road R22, it is necessary to transfer to the right lane in advance before the exit to the road R22. Also, it is difficult and unsafe for the driver to pay sufficient attention to the display 2, since the exit to the road R22 and the exit to the road R21 are confusing and there is a curve near the exits.

Figure 7:
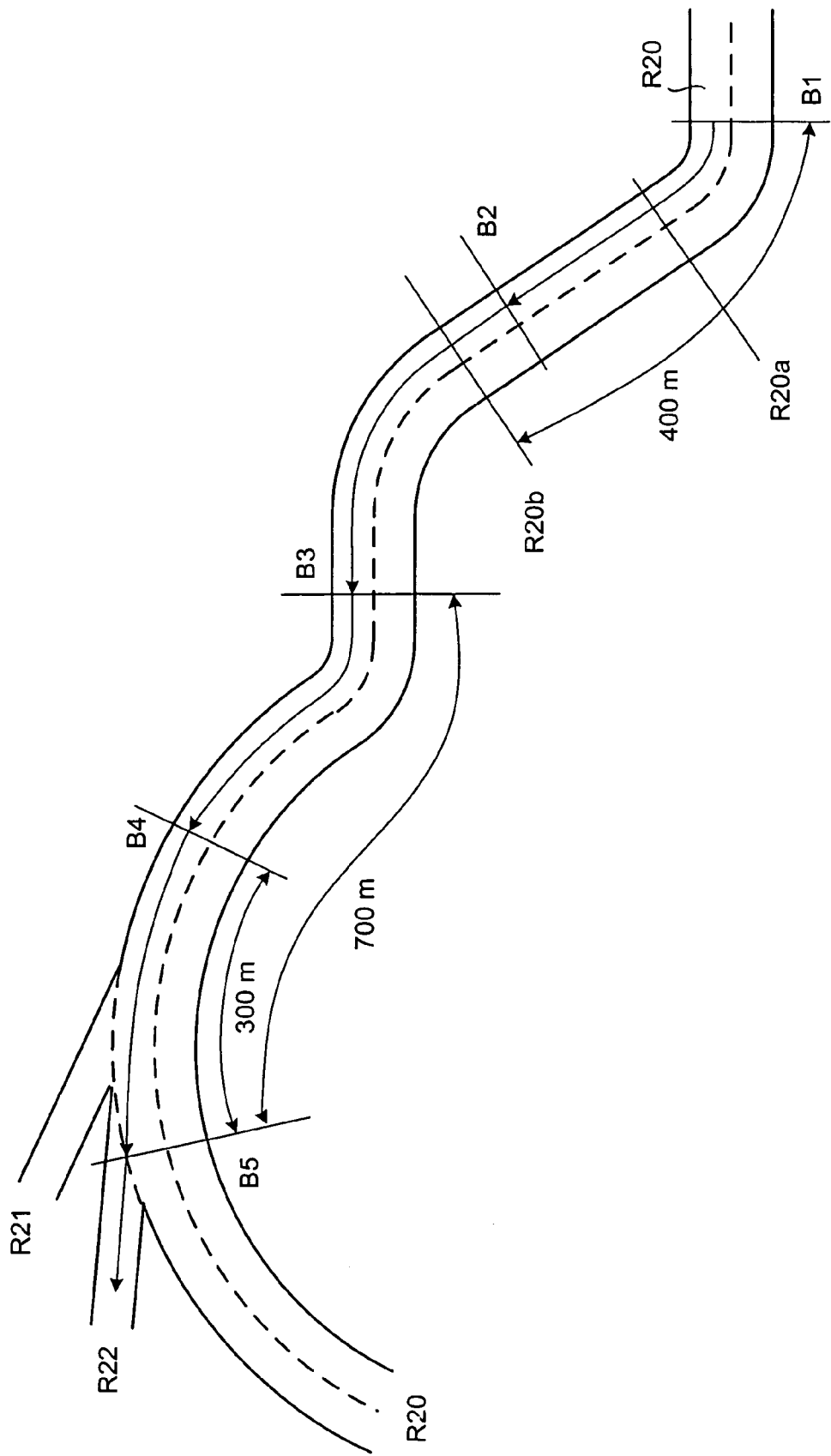
FIG. 7 is a schematic to explain a second specific example of the guidance according to the present invention.
Figure 8:
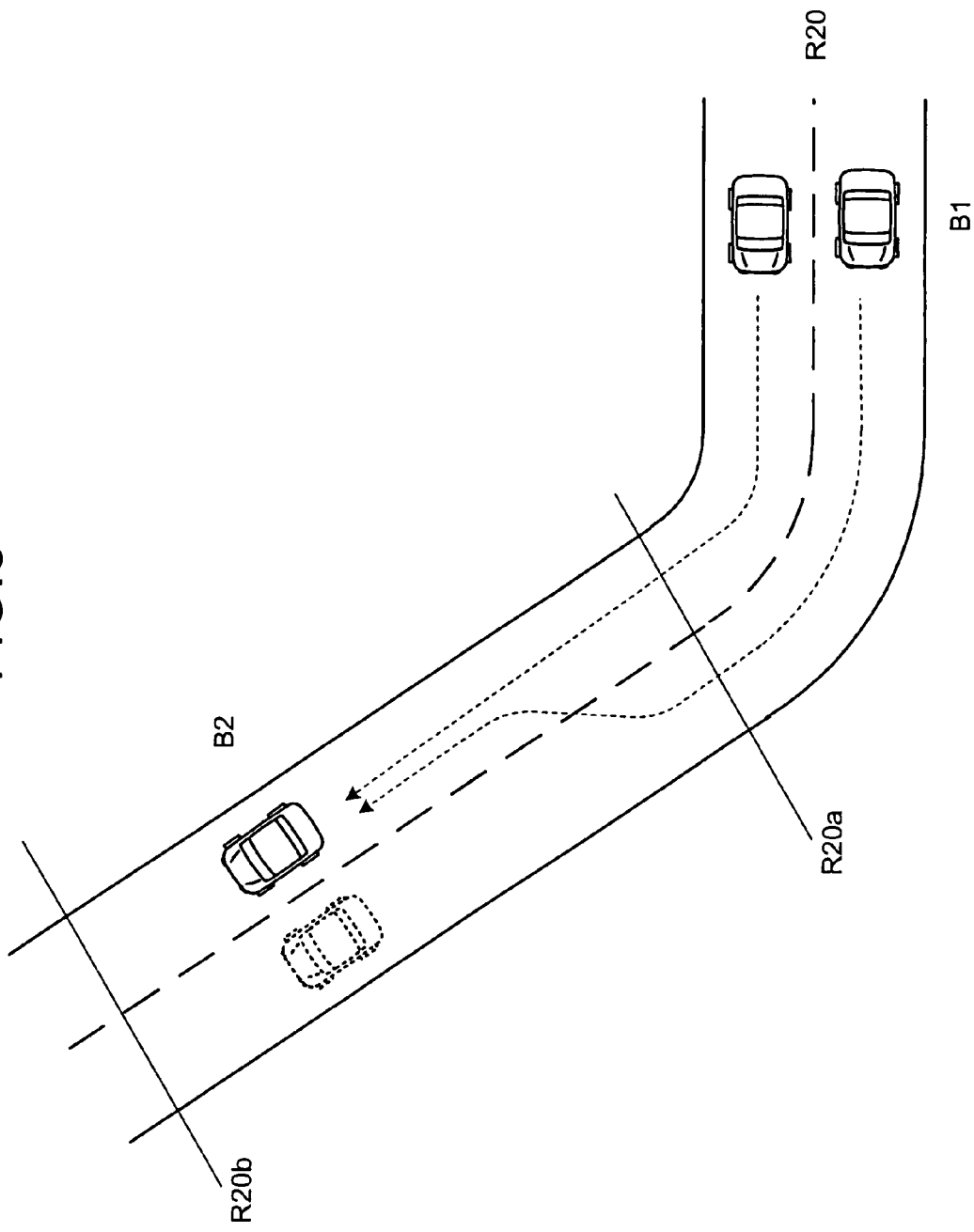
FIG. 8 is a schematic for further describing the specific example shown in FIG. 7 (part 1).
Figure 11:
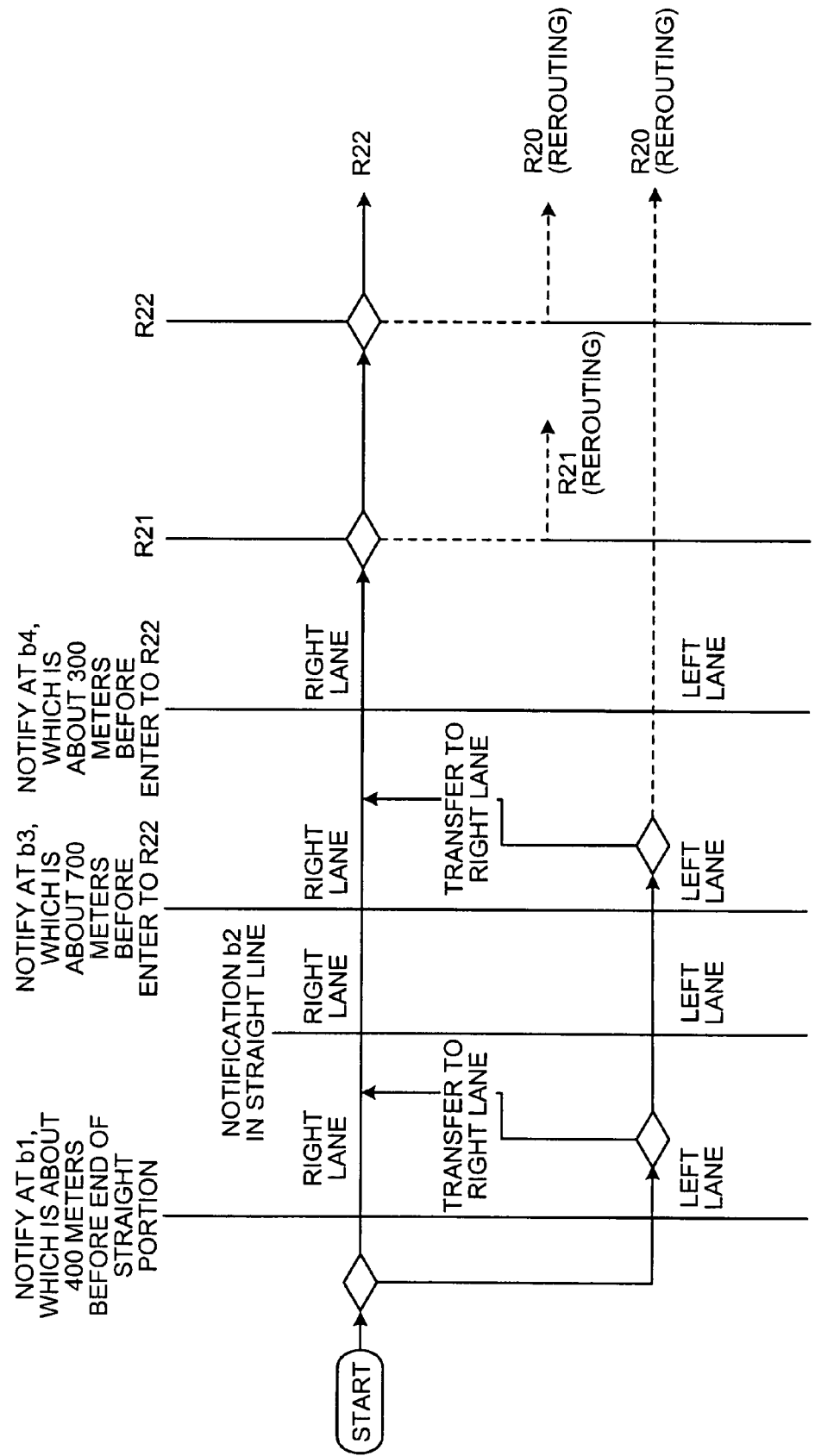
FIG. 11 is a schematic for further describing the specific example shown in FIG. 7 (part 3).

First, under the conditions shown in FIG. 7, guidance to the end position R20b of the straight line is described with reference to FIGS. 8 and 11. In the long straight portion (from the start position R20a to the end position R20b), guidance is initiated when the vehicle arrives at the position B1, which is about 400 meters before the end position R20b of the long straight portion, to notify information to the driver about the vicinity of the exit to the road R22 via display.

If the vehicle is driving in the right lane at the position B1, the navigation apparatus 1 outputs voice to instruct the driver to enter the road R22 and also outputs voice to instruct the driver to keep driving in the right lane since a divergence to the road R22 is in the right lane. Moreover, a map of a current area around the vehicle is displayed on the display 2.

On the other hand, if the vehicle is driving in the left lane at the position B1, the navigation apparatus 1 outputs voice to instruct the driver to enter the road R22 and to transfer to the right lane since the divergence to the road R22 is in the right lane. Moreover, a map of a current area around the vehicle is displayed on the display 2.

Thereafter, when the vehicle arrives at the long straight portion (from the start position R20a to the end position R20b), a map of an area around the position B5 is displayed on the display 2 so that the driver can recognize the fact that the exit to the road R22 is located immediately after the exit to the road R21, i.e., the exit can be confusing. By displaying such a map while the vehicle is driving in the long straight portion, the driver can safely check the display contents.

Specific contents of guidance to be notified via voice guidance include the facts that "the exit to the road R21 and the exit to the road R22 are confusing", "the distance to the exit to the road R22 is only about 120 meters after passing the exit to the road R21", and the like. Moreover, a map of an area around the position B5 is displayed on the display 2. In this case, voice guidance and display guidance are the same regardless of whether the vehicle is driving in the right lane or the left lane.

Figure 9:
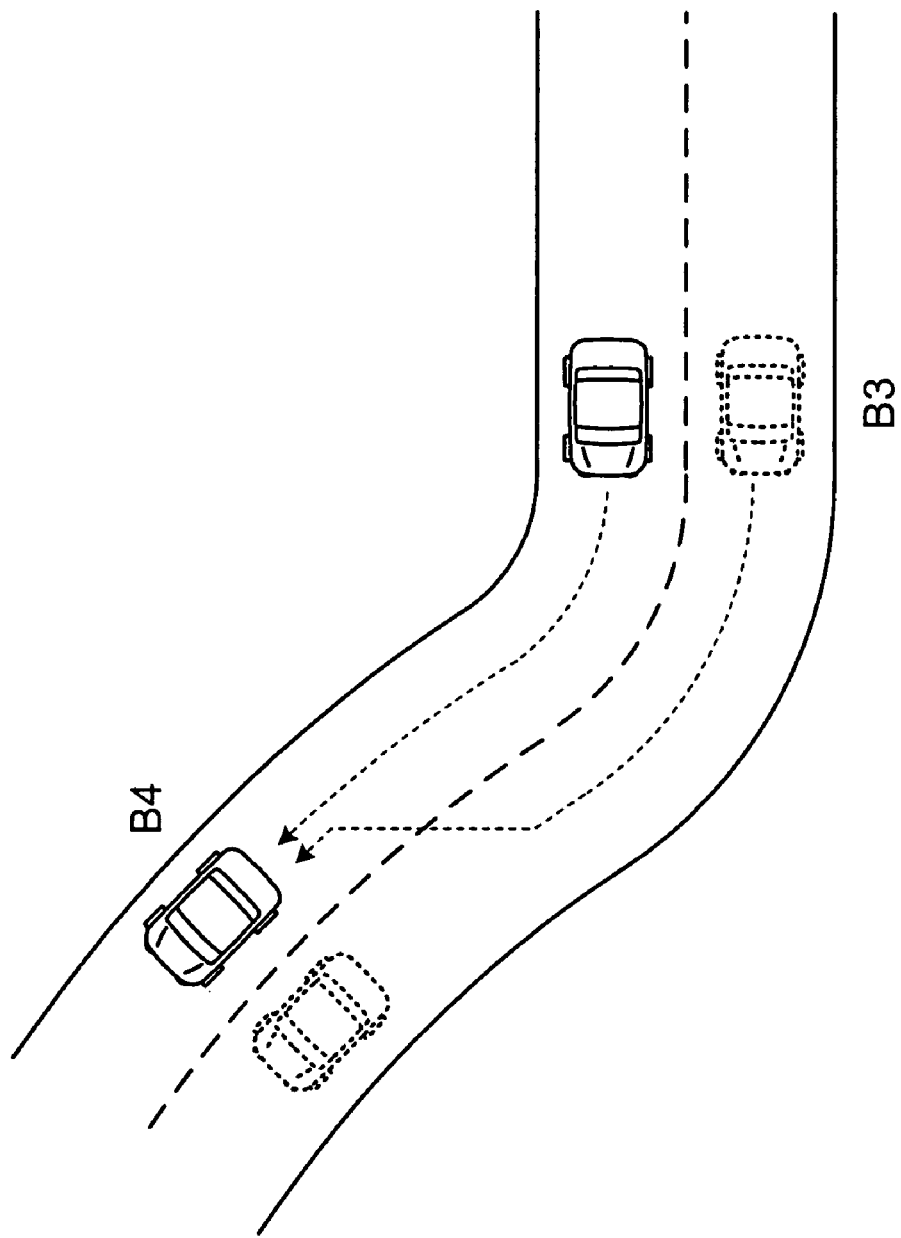
FIG. 9 is a schematic for further describing the specific example shown in FIG. 7 (part 2).

Thereafter, as shown in FIG. 9, when the vehicle arrives at a position B3, which is about 700 meters before the exit to the road R22, if the vehicle is in the right lane, voice guidance instructs the driver to keep driving in the right lane since the divergence to the road R22 is in the right lane about 700 meters ahead. Furthermore, a map of a current area around the vehicle is displayed on the display 2.

In the same manner, when the vehicle arrives at the position B3, if the vehicle is driving in the left lane (the lane is not changed from the position B1), voice guidance instructs the driver to change lanes to the right lane since the divergence to the road R22 is in the right lane about 700 meters ahead. Furthermore, a map of a current area around the vehicle is displayed on the display 2.

Figure 10:
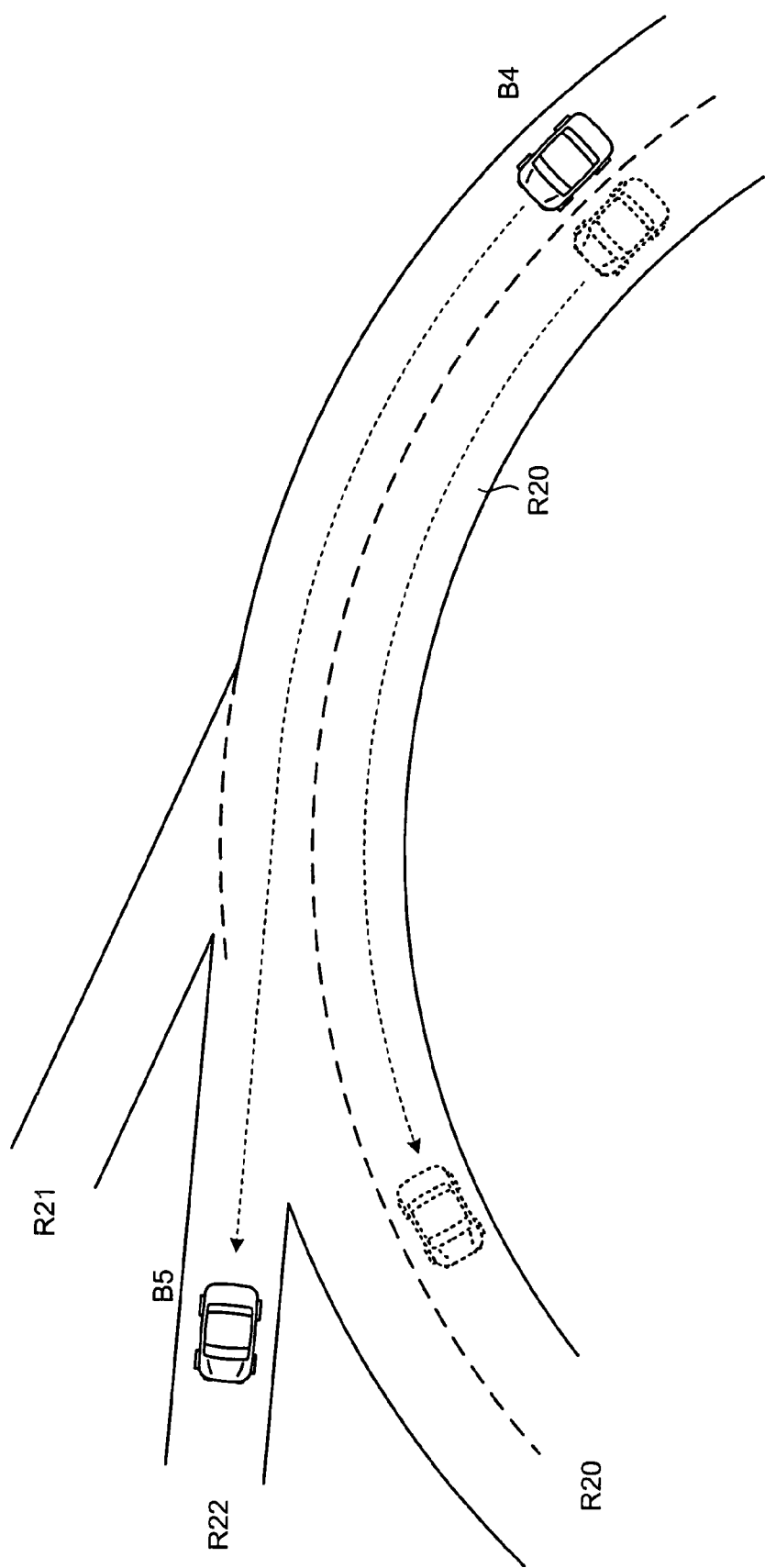
FIG. 10 is a schematic for further describing the specific example shown in FIG. 7 (part 3).

Thereafter, as shown in FIG. 10, when the vehicle arrives at a position B4, which is about 300 meters before the exit to the road R22, if the vehicle is driving in the right lane, voice guidance instructs the driver to enter the road R22 after passing the exit to the road R21 without erroneously entering the road R21. Moreover, the fact that the exit to the road R22 is immediately after the exit to the road R21 is notified to the driver. Furthermore, a map of an area around the exit to the road R22 is displayed on the display 2.

On the other hand, when the vehicle arrives at a position B4, if the vehicle is driving in the left lane i.e., the vehicle has not transferred to the right lane, voice guidance instructs the driver to keep driving on the road R20 since it is dangerous to change lanes to the right at this time. By keeping driving on the road R20, the vehicle swerves from the driving schedule course. Therefore, a new driving schedule course for driving from the road R20 to the road R22 is set (rerouted) and the new route is displayed on the display 2.

As mentioned above, in the navigation apparatus 1 according to the present embodiment, the GPS 11 obtains the position information, the lane recognition section 12 recognizes the current driving lane of the vehicle, the driver recognition section 13 recognizes the driver, and the driving-history data storage section 23 stores therein the driving course history of the vehicle. Moreover, the lane-course setting section 22 sets the course of lane in which the vehicle is to drive based on the driving schedule course and the driving lane, and the guidance process section 30 controls the contents of the course guidance and the timing to be given the course guidance based on shape of the road, the level of difficulty in driving, skill of the driver, driving history, and traffic conditions. Thus, it is possible to perform guidance with suitable contents at suitable timing depending on the situation.

Industrial Applicability

As set forth hereinabove, a driving support apparatus according to the present invention is suitable for support in driving operation of a vehicle, and particularly effective for notifying course guidance to the driver.

The invention claimed is:

1. A driving support apparatus that supports a driver in driving a vehicle on a road by giving instructions, the driving support apparatus comprising:
a recognizing unit configured to recognize a current driving lane of the vehicle that is a lane on the road in which the vehicle is currently running;
a lane setting unit configured to set a driving schedule lane that is a lane in which the vehicle is to be driven; and
a guiding unit configured to determine content of lane guidance based on the driving schedule lane and the current driving lane, change a performance timing for performing guidance to a timing at which the road is substantially straight, and guide the driver to a lane based on the lane guidance at the changed performance timing.

2. The driving support apparatus according to claim 1, further comprising a course setting unit configured to set a driving schedule course that is a course in which the vehicle is to be driven, wherein the guiding unit guides the driver to a driving course based on the driving schedule course.

3. The driving support apparatus according to claim 2, wherein the guiding unit includes a difficulty-level judging unit configured to judge at least one of a level of difficulty in driving in accordance with the driving schedule lane and a level of difficulty in driving in accordance with the driving schedule course and notifies the driver of factors that have caused a rise in the level of difficulty.

4. The driving support apparatus according to claim 3, wherein the difficulty-level judging unit judges the level of difficulty using the current driving lane and map data indicative of shapes of the road and number of lanes on the road.

5. The driving support apparatus according to claim 2, wherein the guiding unit includes a course-resetting judging unit configured to judge whether resetting of the driving schedule course is necessary based on difficultness in driving in the driving schedule lane.

6. The driving support apparatus according to claim 2, wherein the lane setting unit sets the driving schedule lane based on the driving schedule course and map data indicative of shapes of the road and number of lanes on the road.

7. The driving support apparatus according to claim 6, wherein the lane setting unit sets the driving schedule lane based on at least any one of the level of difficulty in driving in accordance with the driving schedule lane, driver information indicative of driving skills of the driver, and traffic information indicative of traffic conditions on the road.

8. The driving support apparatus according to claim 1, further comprising:
a map-data storage unit configured to store map-data indicative of shapes of roads, wherein
the guiding unit changes the performance timing based on the shapes of roads.

9. The driving support apparatus according to claim 1, further comprising a map-data storing unit configured to store therein map data indicative of shapes of the road and number of lanes on the road.

10. The driving support apparatus according to claim 1, further comprising a driver-information obtaining unit configured to obtain driver information indicative of driving skills of the driver.

11. The driving support apparatus according to claim 1, further comprising a traffic-information obtaining unit configured to obtain traffic information indicative of traffic conditions on the road.

12. The driving support apparatus according to claim 1, wherein the guiding unit includes a driver adapting unit configured to change contents of guidance to the driver based on driver information indicative of driving skills of the driver.

13. A method of supporting a driver in driving a vehicle on a road by giving instructions, the method comprising:
recognizing a current driving lane of the vehicle that is a lane on the road in which the vehicle is currently running;
setting a driving schedule lane that is a lane in which the vehicle is to be driven;
determining content of lane guidance based on the driving schedule lane and the current driving lane;
changing a performance timing for performing guidance to a timing at which the road is substantially straight; and
guiding the driver to a lane based on the lane guidance at the changed performance timing.

* * * * *